United States Patent
Pang et al.

(10) Patent No.: US 11,192,072 B2
(45) Date of Patent: Dec. 7, 2021

(54) SYSTEM AND METHOD OF PRODUCING FOAMED CEMENT IN A LABORATORY ENVIRONMENT

(71) Applicant: Halliburton Energy Services, Inc., Houston, TX (US)

(72) Inventors: Xueyu Pang, Tomball, TX (US); Walmy Cuello Jimenez, Houston, TX (US); John P. Singh, Kingwood, TX (US); Thomas Singh Sodhi, New Caney, TX (US); Aaron Cade Prince, Plain City, OH (US); Joe Kleber Maxson, Porter, TX (US); Ronnie Glen Morgan, Waurika, OK (US)

(73) Assignee: Halliburton Energy Services, Inc., Houston, TX (US)

( * ) Notice: Subject to any disclaimer, the term of this patent is extended or adjusted under 35 U.S.C. 154(b) by 520 days.

(21) Appl. No.: 16/094,182

(22) PCT Filed: Sep. 30, 2016

(86) PCT No.: PCT/US2016/054661
§ 371 (c)(1),
(2) Date: Oct. 16, 2018

(87) PCT Pub. No.: WO2018/063285
PCT Pub. Date: Apr. 5, 2018

(65) Prior Publication Data
US 2019/0134573 A1    May 9, 2019

(51) Int. Cl.
*B01F 3/00* (2006.01)
*B01F 3/04* (2006.01)
(Continued)

(52) U.S. Cl.
CPC ........ *B01F 3/04446* (2013.01); *B01F 5/0275* (2013.01); *B28B 7/0094* (2013.01);
(Continued)

(58) Field of Classification Search
CPC ................ B01F 3/04446; B01F 5/0725; B01F 2215/0037; B01F 2215/0047; B28C 5/06;
(Continued)

(56) References Cited

U.S. PATENT DOCUMENTS 4,457,375 A    7/1984  Cummins
4,789,244 A  * 12/1988  Dunton ............... B01F 3/04992
                                                    366/101

(Continued)

FOREIGN PATENT DOCUMENTS

DE         10110917 A1    5/2003

OTHER PUBLICATIONS

Jean De Rozieres and Remi Ferriere, Foamed-Cement Characterization Under Downhole Conditions and its Impact on Job Design, SPE-19935-PA, pp. 297-304, Society of Petroleum Engineers, first presented at the 1990 IADC/SPE Drilling Conference held in Houston, TX, Feb. 27-Mar. 2, 1991.

(Continued)

*Primary Examiner* — Anshu Bhatia
(74) *Attorney, Agent, or Firm* — McAfee & Taft

(57) ABSTRACT

Systems and methods related to preparing foamed cement for laboratory analysis are provided. A prepared cement slurry is placed in a cement reservoir cell configured to pressurize the cement slurry contained within the cement reservoir cell to a capture pressure. After pressurization, the cement slurry and a compressed gas are introduced into a foam generator. Foamed cement generated in the foam generator is introduced from the tee into a foam capture cell where it can cure prior to analysis.

20 Claims, 7 Drawing Sheets

(51) Int. Cl.
- *B28C 5/06* (2006.01)
- *B01F 5/02* (2006.01)
- *B28B 7/00* (2006.01)
- *G01N 1/38* (2006.01)
- *C09K 8/473* (2006.01)
- *E21B 33/138* (2006.01)

(52) U.S. Cl.
CPC ............ *B28C 5/06* (2013.01); *C09K 8/473* (2013.01); *E21B 33/138* (2013.01); *G01N 1/38* (2013.01); *B01F 2215/0037* (2013.01); *B01F 2215/0047* (2013.01); *G01N 2001/387* (2013.01)

(58) Field of Classification Search
CPC ..... B28B 7/0094; C09K 8/473; E21B 33/139; G01N 1/38; G01N 2001/387
See application file for complete search history.

(56) References Cited

U.S. PATENT DOCUMENTS

| | | | |
|---|---|---|---|
| 4,797,003 A | | 1/1989 | Cameron et al. |
| 5,102,228 A | * | 4/1992 | Vine-Lott ........... B01F 3/04992 137/599.04 |
| 5,356,565 A | | 10/1994 | Southwell |
| 5,393,341 A | | 2/1995 | Rume |
| 6,484,568 B1 | | 11/2002 | Griffith et al. |
| 7,588,612 B2 | | 9/2009 | Marwitz et al. |
| 2007/0123434 A1 | * | 5/2007 | Lewis ................ C04B 40/0039 507/254 |

OTHER PUBLICATIONS

Barbara Kutchko et al., Assessment of Foamed Cement Used in Deep Offshore Wells, SPE-170298-MS, Society of Petroleum Engineers, pp. 1-20, presented at the SPE Deepwater Drilling and Completions Conference held in Galveston, TX, Sep. 10-11, 2014.

Torgeir Kjostvedt, New Methodology for Laboratory Mixing of Foam Cement to Better Reflect Onsite Mixing Method, Master's Thesis, University of Stavanger, May 6, 2011, Stavanger, Norway.

Xueyu Pang et al., Multiscale Characterization of Foamed Cement Using X-Ray Microcomputed Tomography, SPE-180278-MS, Society of Petroleum Engineers, pp. 1-21, presented at the SPE Deepwater Drilling & Completions Conference held in Galveston, TX, Sep. 14-15, 2016.

Trent Jacobs, Offshore Industry Gets a Fresh Look at Foamed Cement, SPE-0115-0058 JPT, pp. 59-63, Jan. 2015.

D. Glosser, et al., Relationship between operational variables, fundamental physics and foamed cement properties in lab and field generated foamed cement slurries, J. Petrol. Sci. Eng., (2016).

Recommended Practice on Preparation and Testing of Foamed Cement Slurries at Atmospheric Pressure, ANSI/API Recommended Practice 10B-4, First Edition, Jul. 2004, American Petroleum Institute.

Examination Report Issued in United Kingdom Application No. GB1817834.3, dated Jul. 23, 2021.

* cited by examiner

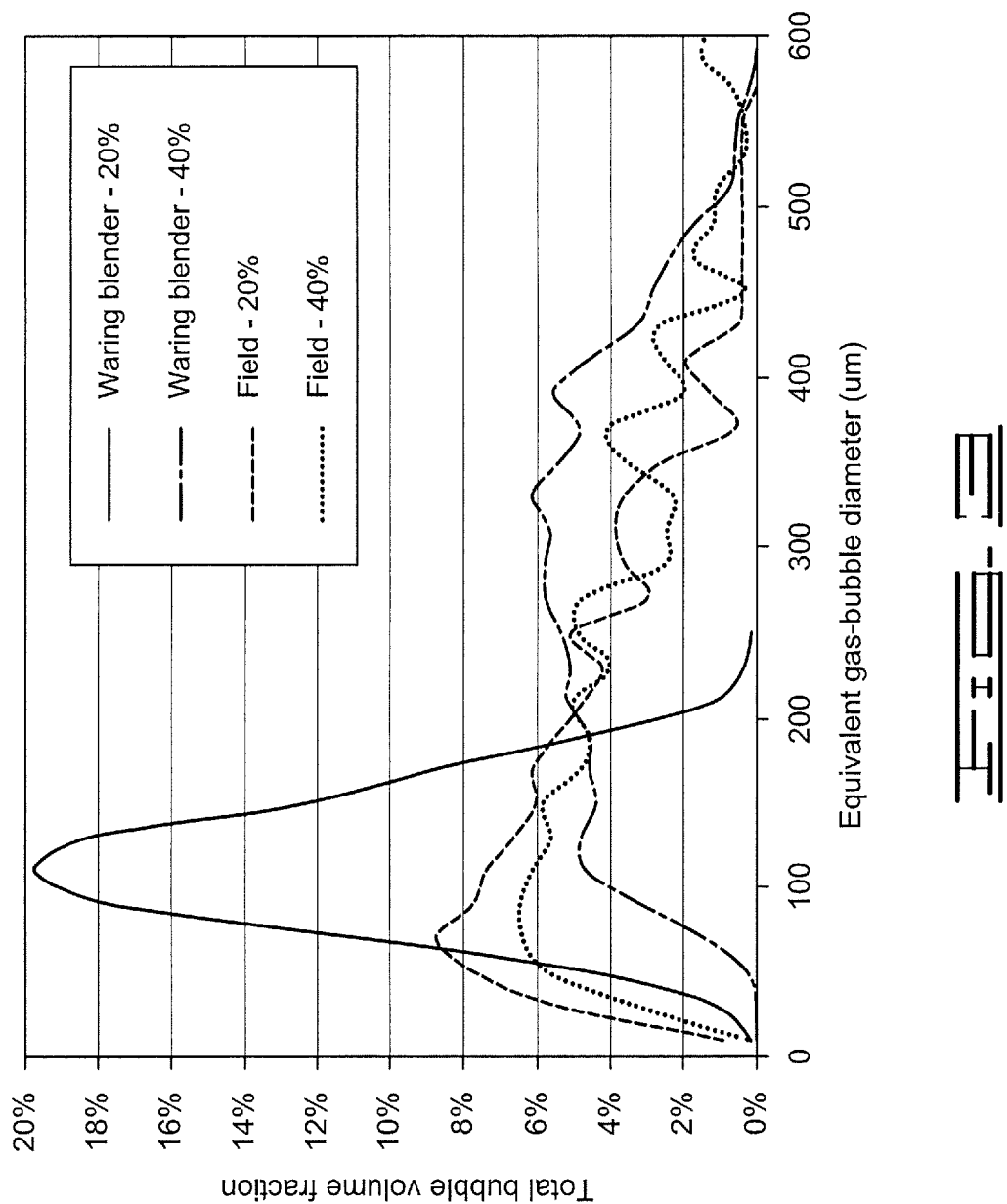

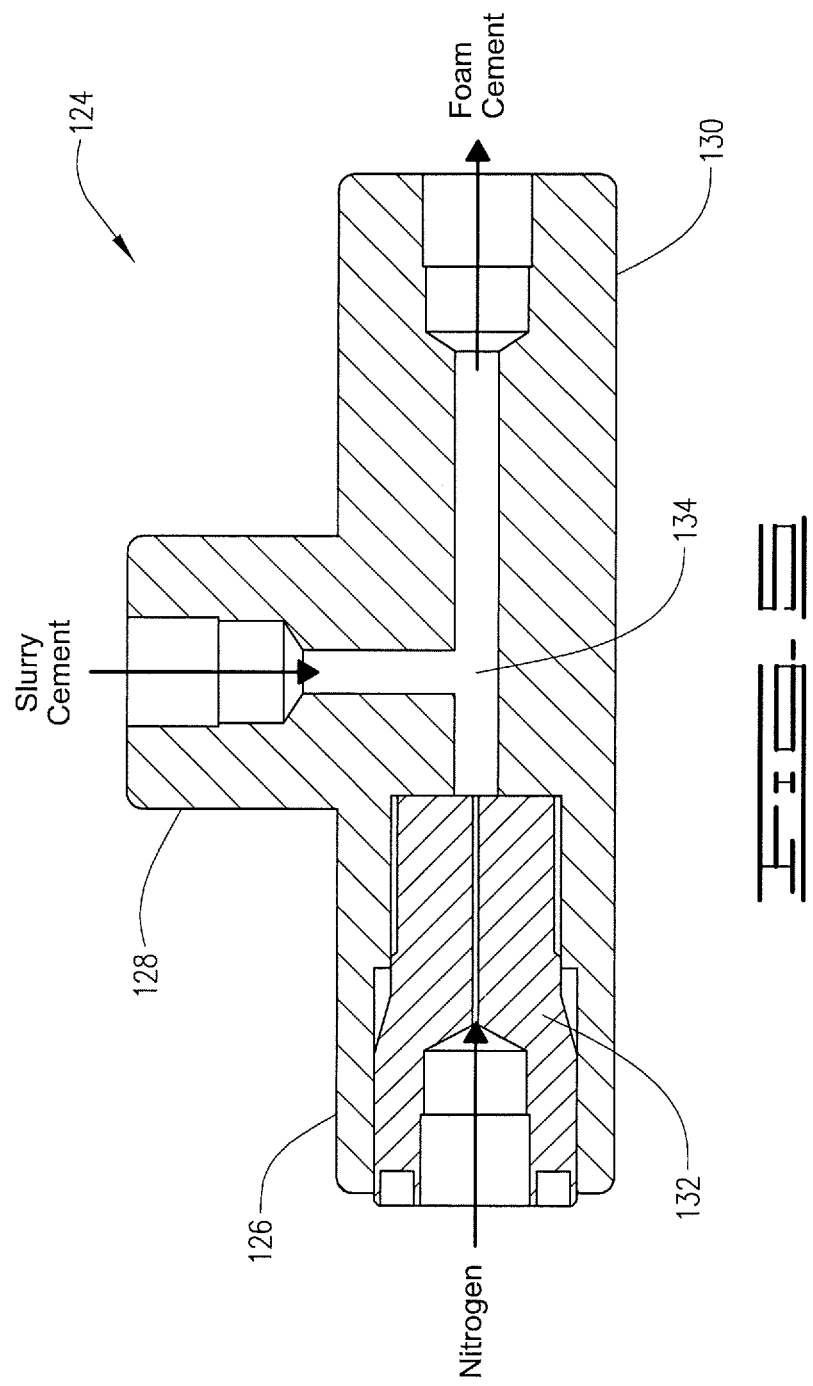

SYSTEM AND METHOD OF PRODUCING FOAMED CEMENT IN A LABORATORY ENVIRONMENT

FIELD

This disclosure relates to systems and methods for producing foamed cement as used in oil and gas wells. More specifically, it relates to laboratory systems and methods of producing foamed cement to emulate foamed cement produced at the well site.

BACKGROUND

Cementing has been used in oil well drilling since the early 20th century. It has become a very important factor to achieving good integrity of an oil well. Foamed cement is a lightweight cement that has become an important solution for zonal isolation in oil and gas wells. It provides a variety of benefits over the traditional cement systems. Enhanced mechanical properties, improved strength-to-density ratio, improved mud displacement, improved bonding with casing and formation, reduced gas migration risk, and improved long-term well integrity are some of the advantages.

Laboratory testing is an essential contributor to successful field results in oil well cementing operations. Laboratory testing provides an indication of how the cement will behave when used in the field. Unfortunately, often the properties of foamed cement produced in laboratory conditions do not seem to match with the actual results in the field, which may lead to less than optimum foam-cement designs. This can be because the method used to generate foamed cement in the laboratory is fundamentally different from that in the field. Accordingly, laboratory generated foamed cement that more closely parallels field generated foamed cement would be a great aid in designing optimum foamed cements for specific wells.

BRIEF DESCRIPTION OF THE DRAWINGS

FIG. 3 is a chart of gas-bubble size distribution of foamed cement produced with a Waring blender according to API 10B-4 and produced with field equipment at a well site.

FIG. 5 is a schematic view of a foam generator suitable for use in the test system of FIG. 4.

FIG. 6 is a chart of gas-bubble size versus cumulative distribution by volume for foamed cement samples produced with different methods and apparatuses.

DETAILED DESCRIPTION

Figure 1:
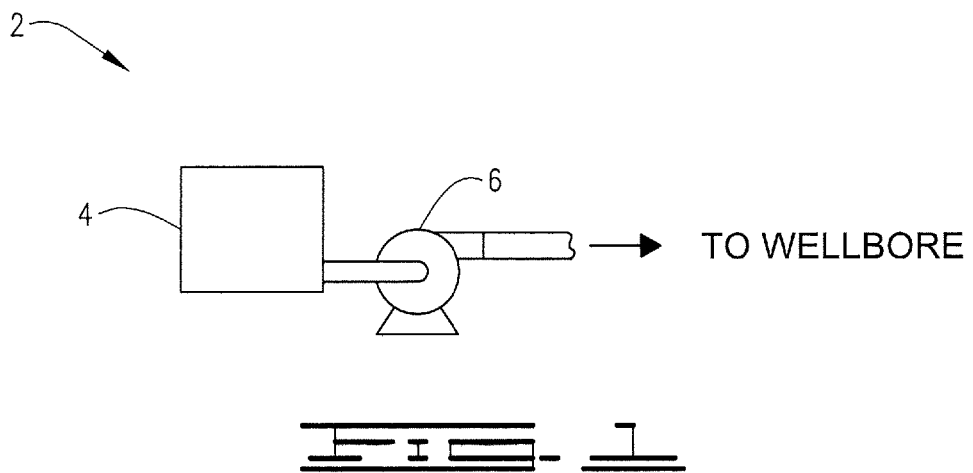
FIG. 1 illustrates a system for preparation and delivery of a cement composition to a wellbore.

The present disclosure may be understood more readily by reference to the following detailed description as well as to the examples included therein. In addition, numerous specific details are set forth in order to provide a thorough understanding of the embodiments described herein. However, those of ordinary skill in the art will understand that the embodiments described herein can be practiced without these specific details. In other instances, methods, procedures and components have not been described in detail so as not to obscure the related relevant feature being described. Additionally, the description is not to be considered as limiting the scope of the embodiments described herein.

Referring now to the drawings, wherein like reference numbers are used herein to designate like elements throughout the various views, various embodiments are illustrated and described. The figures are not necessarily drawn to scale, and in some instances the drawings have been exaggerated and/or simplified in places for illustrative purposes only. In the following description, the terms "upper," "upward," "lower," "below," and the like, are used for the embodiments illustrated; however, one skilled in the art will realize that generally the apparatus or parts thereof described can be in other orientations. The terms "inwardly" and "outwardly" are directions toward and away from, respectively, the geometric center of a referenced object. Where components of relatively well-known designs are employed, their structure and operation will not be described in detail. One of ordinary skill in the art will appreciate the many possible applications and variations of the present invention based on the following description.

As indicated above, cementing in oil and gas wells is an important factor to achieve good integrity of the well. Cement, including foamed cement, may directly or indirectly affect one or more components or pieces of equipment associated with the preparation, delivery, recapture, recycling, reuse, and/or disposal of the disclosed cement compositions. For example, cement compositions may directly or indirectly affect one or more mixers, related mixing equipment, mud pits, storage facilities or units, composition separators, heat exchangers, sensors, gauges, pumps, compressors, and the like used generate, store, monitor, regulate, and/or recondition the exemplary cement compositions. Cement compositions may also directly or indirectly affect any transport or delivery equipment used to convey the cement compositions to a well site or downhole such as, for example, any transport vessels, conduits, pipelines, trucks, tubulars, and/or pipes used to compositionally move the cement compositions from one location to another, any pumps, compressors, or motors (e.g., topside or downhole) used to drive the cement compositions into motion, any valves or related joints used to regulate the pressure or flow rate of the cement compositions, and any sensors (i.e., pressure and temperature), gauges, and/or combinations thereof, and the like. Cement compositions may also directly or indirectly affect the various downhole equipment and tools that may come into contact with the cement compositions/additives such as, but not limited to, wellbore casing, wellbore liner, completion string, insert strings, drill string, coiled tubing, slickline, wireline, drill pipe, drill collars, mud motors, downhole motors and/or pumps, cement pumps, surface-mounted motors and/or pumps, centralizers, turbolizers, scratchers, floats (e.g., shoes, collars, valves, etc.), logging tools and related telemetry equipment, actuators (e.g., electromechanical devices, hydromechanical devices, etc.), sliding sleeves, production sleeves, plugs, screens, filters, flow control devices (e.g., inflow control devices, autonomous inflow control devices, outflow control devices, etc.), couplings (e.g., electro-hydraulic wet connect, dry connect, inductive coupler, etc.), control lines (e.g., electrical, fiber optic, hydraulic, etc.), surveillance lines, drill bits and reamers, sensors or distributed sensors, downhole heat exchangers, valves and corresponding actuation devices, tool seals, packers, cement plugs, bridge plugs, and other wellbore isolation devices, or components, and the like.

Turning now to the figures, FIG. 1 illustrates a system 2 for preparation of a cement composition and delivery to a wellbore as might be done at a field site. As shown, the cement composition may be mixed in mixing equipment 4, such as a jet mixer, re-circulating mixer, or a batch mixer, for example, and then pumped via pumping equipment 6 to the wellbore. In some embodiments, the mixing equipment 4 and the pumping equipment 6 may be disposed on one or more cement trucks as will be apparent to those of ordinary skill in the art. In some embodiments, a jet mixer may be used, for example, to continuously mix the composition, including water, as it is being pumped to the wellbore.

Figure 2A:
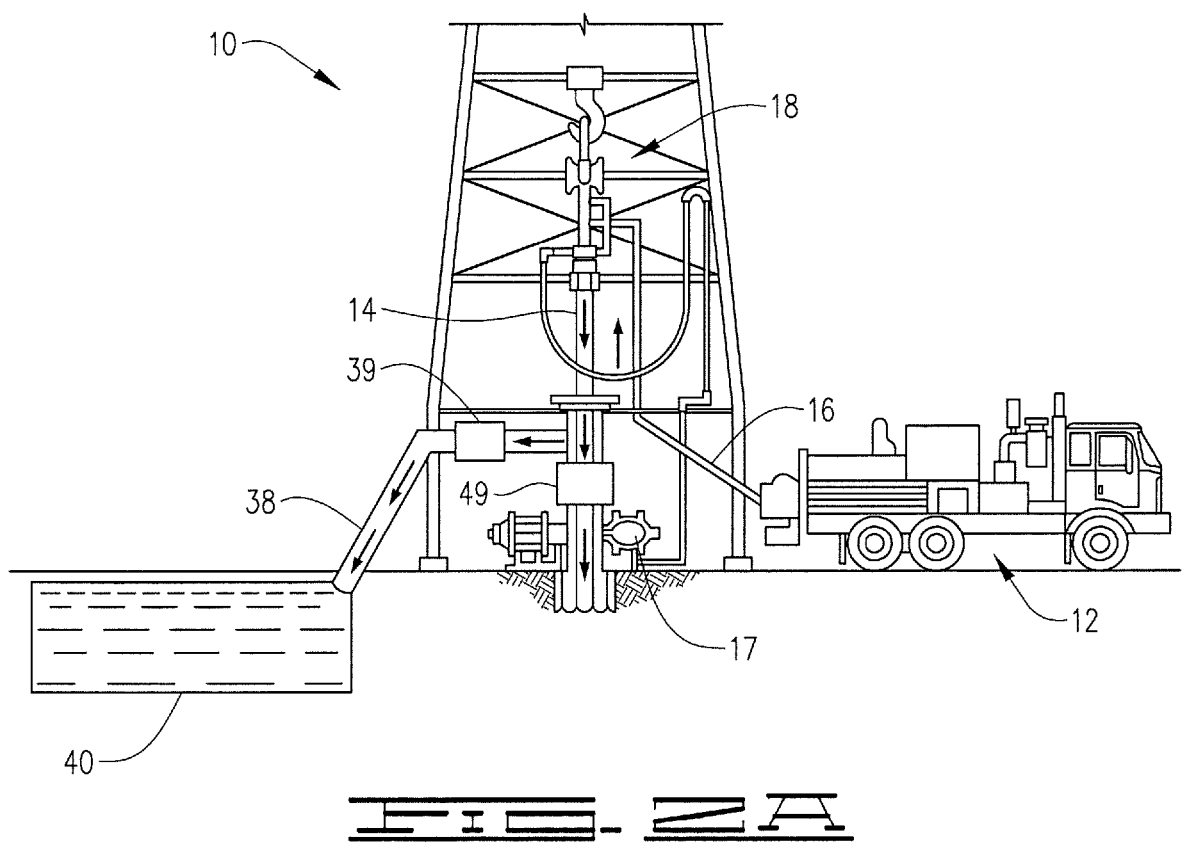
FIG. 2A illustrates surface equipment that may be used in placement of a cement composition in a wellbore.

An example technique and system for placing a cement composition into a subterranean formation will now be described with reference to FIGS. 2A and 2B. FIG. 2A illustrates surface equipment 10 that may be used in placement of a cement composition in accordance with certain embodiments. It should be noted that while FIG. 2A generally depicts a land-based operation, those skilled in the art will readily recognize that the principles described herein are equally applicable to subsea operations that employ floating or sea-based platforms and rigs, without departing from the scope of the disclosure. As illustrated by FIG. 2A, the surface equipment 10 may include a cementing unit 12, which may include one or more cement trucks. The cementing unit 12 may include mixing equipment 4 and pumping equipment 6 (e.g., FIG. 1) as will be apparent to those of ordinary skill in the art. The cementing unit 12 may pump a cement composition 14 through a feed pipe 16 and to a cementing head 18 which conveys the cement composition 14 downhole. When foamed cement is used, the surface equipment may include a gas delivery and foam generating system 17 for delivering and mixing a gas, such as nitrogen, into the cement composition.

Figure 2B:
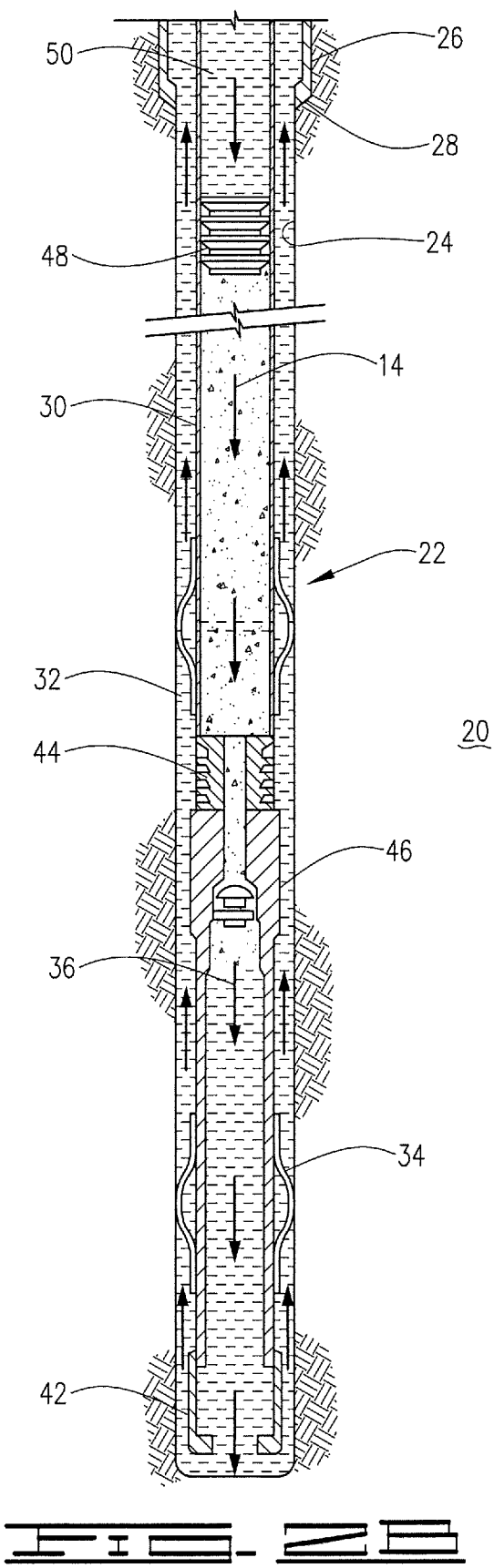
FIG. 2B illustrates placement of a cement composition into a wellbore annulus.

Turning now to FIG. 2B, the cement composition 14 may be placed into a subterranean formation 20 in accordance with example embodiments. As illustrated, a wellbore 22 may be drilled into the subterranean formation 20. While wellbore 22 is shown extending generally vertically into the subterranean formation 20, the principles described herein are also applicable to wellbores that extend at an angle through the subterranean formation 20, such as horizontal and slanted wellbores. As illustrated, the wellbore 22 comprises walls 24. In the illustrated embodiments, a surface casing 26 has been inserted into the wellbore 22. The surface casing 26 may be cemented to the walls 24 of the wellbore 22 by cement sheath 28. In the illustrated embodiment, one or more additional conduits (e.g., intermediate casing, production casing, liners, etc.) shown here as casing 30 may also be disposed in the wellbore 22. As illustrated, there is a wellbore annulus 32 formed between the casing 30 and the walls 24 of the wellbore 22 and/or the surface casing 26. One or more centralizers 34 may be attached to the casing 30, for example, to centralize the casing 30 in the wellbore 22 prior to and during the cementing operation.

With continued reference to FIG. 2B, the cement composition 14 may be pumped down the interior of the casing 30. The cement composition 14 may be allowed to flow down the interior of the casing 30 through the casing shoe 42 at the bottom of the casing 30 and up around the casing 30 into the wellbore annulus 32. The cement composition 14 may be allowed to set in the wellbore annulus 32, for example, to form a cement sheath that supports and positions the casing 30 in the wellbore 22. While not illustrated, other techniques may also be utilized for introduction of the cement composition 14. By way of example, reverse circulation techniques may be used that include introducing the cement composition 14 into the subterranean formation 20 by way of the wellbore annulus 32 instead of through the casing 30.

As it is introduced, the cement composition 14 may displace other fluids 36, such as drilling fluids and/or spacer fluids that may be present in the interior of the casing 30 and/or the wellbore annulus 32. At least a portion of the displaced fluids 36 may exit the wellbore annulus 32 via a flow line 38 and be deposited, for example, in one or more retention pits 40 (e.g., a mud pit), as shown on FIG. 2A. Referring again to FIG. 2B, a bottom plug 44 may be introduced into the wellbore 22 ahead of the cement composition 14, for example, to separate the cement composition 14 from the fluids 36 that may be inside the casing 30 prior to cementing. After the bottom plug 44 reaches the landing collar 46, a diaphragm or other suitable device ruptures to allow the cement composition 14 through the bottom plug 44. In FIG. 2B, the bottom plug 44 is shown on the landing collar 46. In the illustrated embodiment, a top plug 48 may be introduced into the wellbore 22 behind the cement composition 14. The top plug 48 may separate the cement composition 14 from a displacement fluid 50 and also push the cement composition 14 through the bottom plug 44.

The above generally describes cementing operations in a well; however, in order to ensure that foamed cement meets the needs dictated by the well conditions, laboratory testing will usually be performed. Such laboratory testing is an essential contributor to successful field results in oil well cementing operations. Traditionally, laboratory analysis of foamed cement is carried out according to API 10B-4. This standard test method provides for generating foamed cement by mixing air and cement in a multi-blade Waring blender under atmospheric pressure conditions. In the field, foamed cement is generally produced by mixing a stream of high-pressure nitrogen gas with a stream of cement slurry through a jet-mixing nozzle called a "foam generator" under the wellhead pressure. Differences in traditional laboratory foam-cement generation and field foam-cement generation can be seen by reference to FIG. 3. From FIG. 3, it can be seen that the gas bubble size of the lab foam sample has a very narrow distribution range at lower foam quality, which becomes much wider as foam quality increases. Moreover, the median gas bubble size of the lab foam sample increases significantly with increasing foam quality. On the other hand, the gas-bubble size distribution of field foam sample shows very little dependency on foam quality.

"Foam quality" describes the volume of gas relative to the total volume of foam. For instance, a 20% quality implies that there is a volume of 20% gas in the total volume of foam. Similarly, a 40% quality implies that there is a volume of 40% gas in the total volume of foam. Usually the range of foam quality for foamed cements is from about 15% to about 30%, and more typically from 18% to 28%, because a higher quality can cause coalescence of the bubbles and cause excessive permeability.

As will be realized by an analysis of FIG. 3, the traditional laboratory testing procedure does not produce a foamed cement representative of foamed cement produced in the field. Foamed cement produced by traditional laboratory testing procedures has a significantly lower amount of smack bubbles (60 μm or less) than that produced in the field. The gas-bubble size range and distribution are also quite different between traditional laboratory foamed cement and field foamed cement. Thus, due to the differences in morphology caused by the difference in bubble diameter and concentration, the properties of foamed cement determined by traditional lab methods may not be representative of the actual field conditions. In particular, as foam stability has a strong dependence on gas bubble size, current lab tests cannot reliably determine the stability of foamed cement produced in the field.

Figure 4:
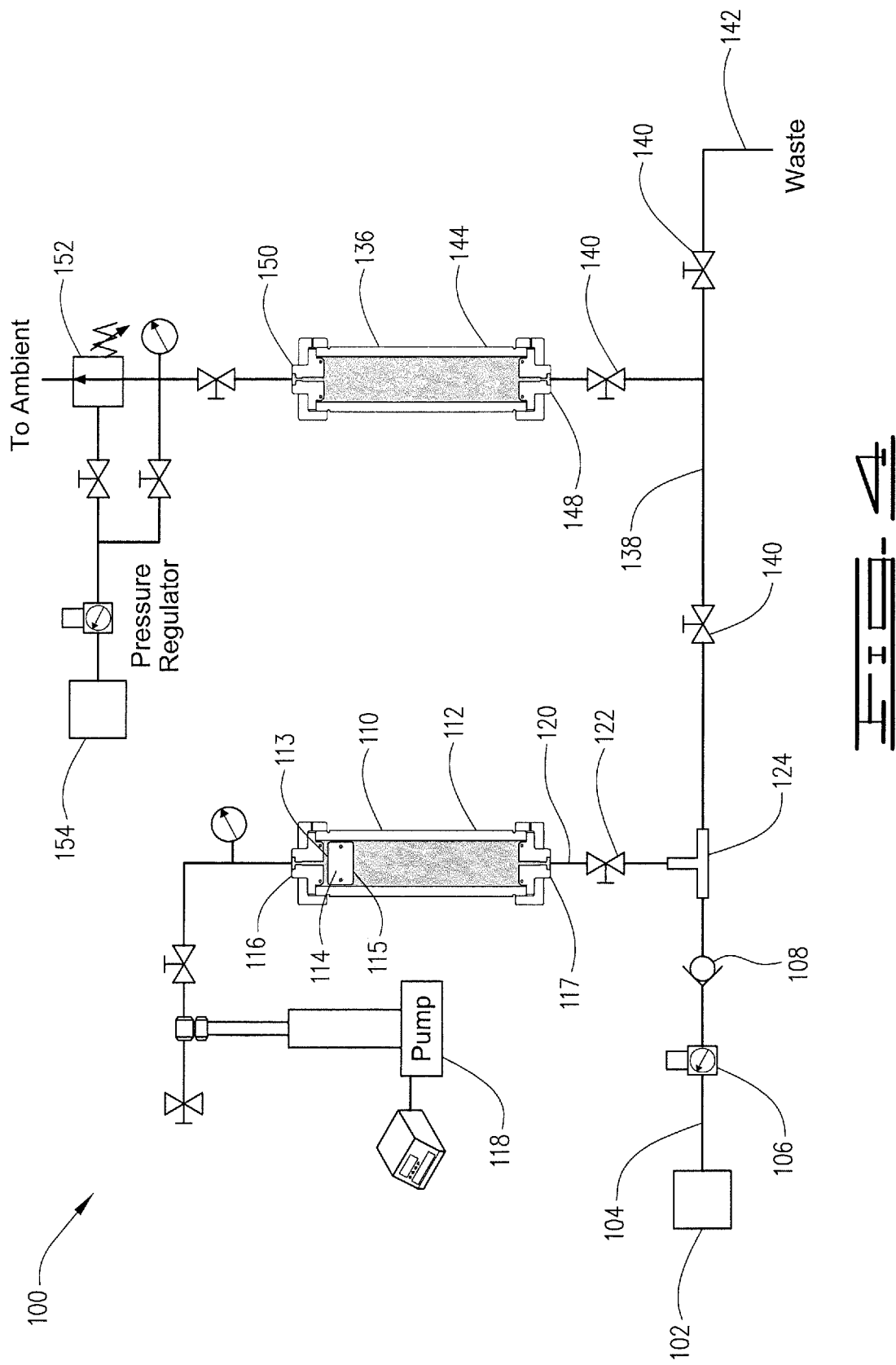
FIG. 4 is a schematic view of a pressurized laboratory foam-cement test system in accordance with aspects of the current disclosure.
Figure 11:
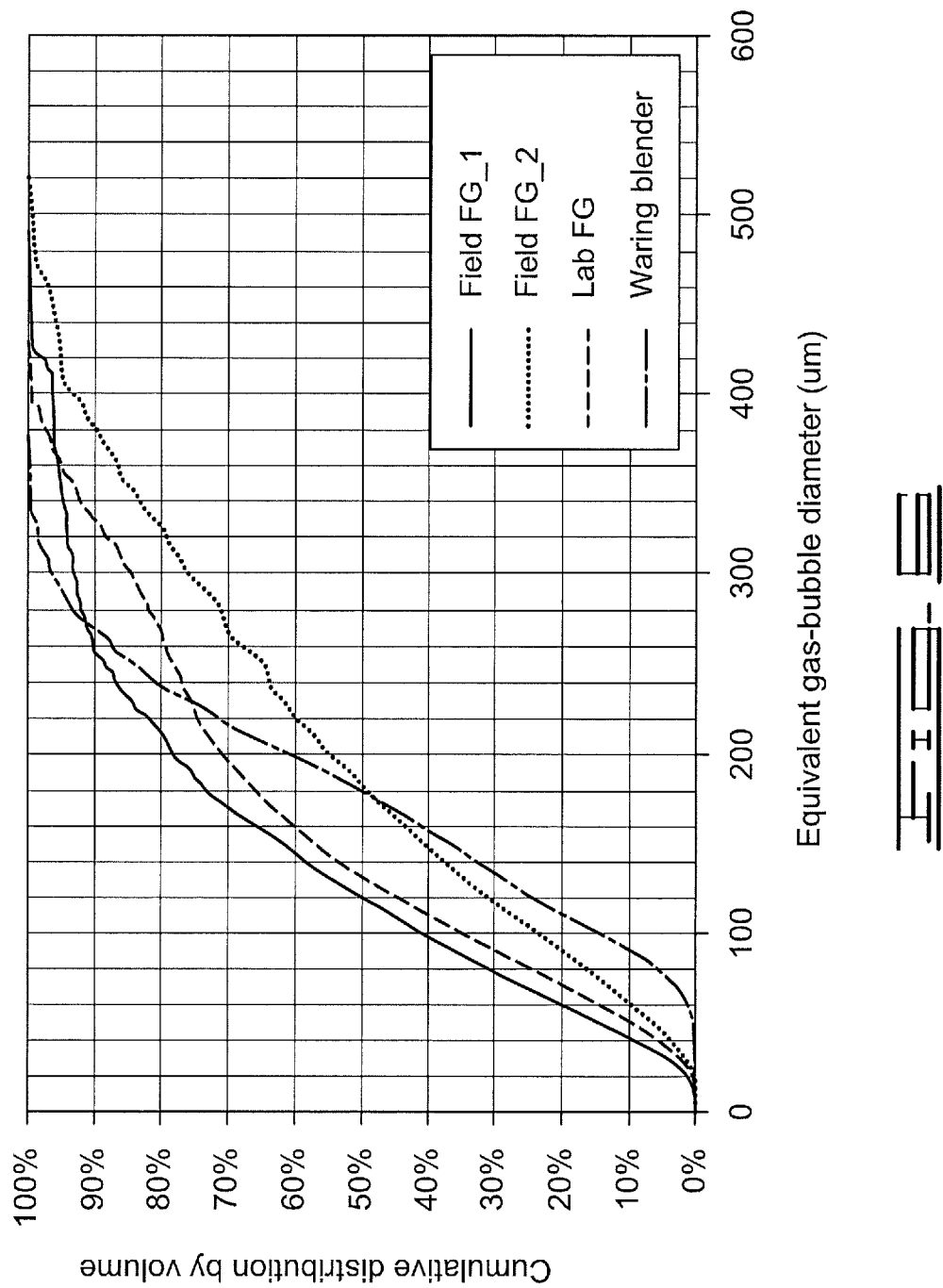

Turning now to FIG. 4, a system or apparatus 100 suitable for preparing foamed cement for laboratory analysis in accordance with this disclosure is illustrated. Apparatus 100 generally comprises a source of pressurized gas 102, a cement reservoir cell 110, a foam generator 124 and foam capture cell 136. Pressurized gas source 102 can be any suitable source, such as a compressor and/or a canister of pressurized gas. Generally, nitrogen is preferred as the gas because nitrogen is inert and standardly used at the well site. However, the gas should be selected to match what will be used at the well site and can be nitrogen, air, hydrogen or another suitable gas.

Pressurized gas source 102 is in fluid flow communication with foam generator tee 124 via conduit 104; thus, pressurized gas from pressurized gas source 102 is introduced to foam generator 124 through conduit 104. Generally, the conduits used in apparatus 100 can be stainless steel tubing. Conduit 104 can include a pressure regulator 106 and a check valve 108, or similar backflow prevention device.

Cement reservoir cell 110 is configured to hold a cement slurry until it is introduced to foam generator 124. Typically, cement reservoir cell 110 can hold the cement slurry at an elevated pressure. As shown, cement reservoir cell 110 comprises a cylinder 112 and a piston 114. The upper end 116 of cement reservoir cell 110 is connected to a pump 118 such that pressure can be applied to a first side 113 of piston 114; thus, as the pressure is applied, piston 114 will apply pressure to cement slurry on a second side 115 of piston 114 and contained in cylinder 112. Thus, cement reservoir cell 110 is configured to pressurize a cement slurry contained within cylinder 112.

Cement reservoir cell 110 is in fluid flow communication with foam generator 124 via conduit 120, which is connected to cement reservoir cell 110 at lower end 117. When valve 122 is closed, the cement slurry can be pressurized to or slightly above the capture pressure. When the cement slurry has been pressurized, valve 122 can be opened to allow flow (driven by pump 118) into foam generator 124. The "capture pressure" is an adjustable parameter for the generation of the laboratory foamed cement. Typically, the capture pressure is selected to correspond with the wellhead pressure in the field operations for which the foamed cement will be used. In this way, the foamed cement generated in the laboratory by apparatus 100 is generated at a corresponding pressure to the foam generation at the well site.

As can be seen from FIG. 5, foam generator 124 may have various configurations. Generally, its configuration will be similar to the foam generator used at the well site; thus, foam generator 124 could have a tee design, a cross design, or another suitable design. As illustrated, foam generator 124 is a foam generator tee and comprises a first leg 126, a second leg 128 and a third leg 130. First leg 126 is in fluid flow communication with conduit 104, and hence, with pressurized gas source 102. First leg 126 contains a choke 132, which controls the rate of gas fed into the foam generator 124 and provides a pressure drop to increase the velocity of the gas. The pressure drop leads to a significant increase in the kinetic energy of the gas, which supplies sufficient mixing energy to produce stable foamed cement. Typically, choke 132 will be an exchangeable choke; that is, choke 132 can be easily replaced with alternative chokes to provide for different rates and/or pressure reductions to accommodate different foamed cement qualities.

Second leg 128 is in fluid flow communication with conduit 120, and hence, with cement reservoir cell 110. As can be seen from FIG. 5, first leg 126 and second leg 128 are perpendicular to each other; thus, gas entering first leg 126 and cement slurry entering second leg 128 mix at intersection 134 to produce foamed cement. The thus produced foamed cement exits foam generator 124 through third leg 130, which is in fluid flow communication with foam capture cell 136, as described below. In some embodiments, first leg 126 and third leg 130 are parallel and in-line. Generally, the leg arrangements will be configured so as to reflect conditions for producing foam at the well site.

In other embodiments, foam generator 124 may have other configurations, such as a cross configuration where there are four legs. Three of the legs are used for introduction of cement slurry or gas, and the fourth leg is used to remove the foamed cement from the foam generator. Typically, suitable foam generators are configured to have a zone where turbulent mixing of the gas and the cement slurry can occur. Further, such foam generators typically utilize a choke as described above for the tee configuration.

Returning to FIG. 4, third leg 130 is in fluid flow communication with foam capture cell 136 through conduit 138. Flow through conduit 138 can be controlled by one or more valves 140. Thus, as illustrated flow out of foam capture cell 136 can be directed to foam capture cell 136 or to waste 142. Additionally, flow out of foam capture cell 136 can be prevented.

As illustrated, foam capture cell 136 comprises a cylinder 144. Foam capture cell 136 can also comprise a piston in some embodiments; however, generally the use of a piston is not preferred in order to aid in depressurization of captured foamed cement for further testing. The foam capture cell is pre-pressurized to a pre-defined foam capture pressure using a pressurized gas from a pump or from another pressurized gas source 154. The pressure of the foam capture cell 136 serves as a backpressure in apparatus 100 before cement is foamed. The pressurized gas for backpressure can be air or any other suitable gas. Typically, it will be nitrogen. The backpressure and flow of gas out of foam capture cell 136 during introduction of foamed cement can be regulated by a suitable backpressure regulator 152, as is known in the art.

Apparatus 100 can use any suitable cylinders for cement reservoir cell 110 and foam capture cell 136. Suitable cells for use as the cement reservoir cell and foam capture cell are commercially available. For example, the cells can be stainless steel tubular reactors. Reactors are available which are double-ended pressure vessels made from stainless-steel seamless tubing. They can have caps of alloy steel with at least one high-pressure connection at each end. Additionally, they can utilize piston separators for separating liquid from a gas and other similar applications.

As described herein, movement of piston 114 has been described as upward or downward and cells 110 and 136 have been described as having upper and lower ends; however, such designations are for convenience. One skilled in the art will realize that cells 110 and 136 can have other orientations.

The above-described apparatus is used to prepare foamed cement in a laboratory environment for analysis to determine the type and quality of foamed cement to use in a downhole operation in a well at the well site or field site. In operation, a base cement slurry is first prepared according to design. A surfactant or foaming agent is then injected into the base cement slurry just before the foam generator. The final foamed cement slurry is created inside the foam generator. The testing is applicable to most base cement compositions and surfactants, which can be chosen by one skilled in the art based on the field applications and conditions at the well site.

For example, a variety of hydraulic cements can be utilized in the cement compositions including those comprised of oxides of calcium, aluminum, silicon, iron and/or sulfur which set and harden by reaction with water. Such hydraulic cements include Portland cements, pozzolana cements, gypsum cements, aluminous cements and silica cements. Portland cements or their equivalents are generally preferred for use in accordance with the present invention. Portland cements of the types defined and described in the API Specification for Materials and Testing for Well Cements, API Specification 10, 5th Edition, dated Jul. 1, 1990 of the American Petroleum Institute are particularly suitable. Preferred API Portland cements include classes A, B, C, G and H with API classes G and H being the most preferred.

Hydraulic cement will typically be mixed with an aqueous fluid, which for example can be fresh water or salt water. The term "salt water" is used herein to mean unsaturated aqueous salt solutions and saturated aqueous salt solutions including brine and seawater. The water is generally present in the cement compositions in an amount sufficient to form a slurry, i.e., an amount in the range of from about 30% to about 100% by weight of hydraulic cement in the compositions, more preferably in an amount in the range of from about 35% to about 60%.

The surfactant can be a suitable foaming and/or foam stabilizing surfactant. Thus, in the above-described hydraulic cement and water base cement composition, a water-soluble mixture of foaming and foam stabilizing surfactants functions to facilitate foaming of the cement composition and to stabilize the foam after it is formed. A non-limiting example of such a mixture of foaming and foam stabilizing surfactants which is preferred for use in accordance with this invention is comprised of an ethoxylated alcohol ether sulfate surfactant, an alkyl or alkene amidopropylbetaine surfactant and an alkyl or alkene amidopropyldimethylamine oxide surfactant. A preferred such mixture is comprised of 63.3 parts by weight of the ethoxylated alcohol ether sulfate surfactant, 31.7 parts by weight of the alkyl or alkene amidopropylbetaine surfactant and 5 parts by weight of the alkyl or alkene amidopropyldimethylamine oxide surfactant. The mixture of surfactants is described in detail in U.S. Pat. No. 6,063,738 issued on May 16, 2000 to Chatterji et al. Based on this disclosure, one trained in the state-of-the-art can readily extend this invention to aqueous solution or dispersion of other similar surfactants for the purpose. The mixture of surfactants is generally included in the aqueous solution or dispersion in an amount in the range of from about 2% to about 15% by weight of water therein, more preferably in an amount of about 4% to about 10%.

After the appropriate cement slurry is prepared, the cement slurry is introduced into cement reservoir cell 110. Valve 122 can be placed in a closed position and pump 118 can be activated to place the cement slurry at or near the capture pressure.

The pressure of the compressed gas from gas source 102 is adjusted and choke 132 is selected to provide for the appropriate pressure and rate for gas entering first leg 126 of foam generator 124. The pressure differential across choke 132 is selected to represent the pressure differential used at the well site for which the foamed cement is being tested. Generally, such pressure differentials are from about 400 psi to about 1400 psi. More typically, the pressure differential will be in the range of about 500 psi to about 1200 psi. In some applications, the pressure differential will be in the range of from about 500 psi to about 1000 psi or from about 800 psi to about 1200 psi.

Typically, the nitrogen velocity downstream of choke 132 increases with pressure drop, which supplies more energy during the foaming process. While not wishing to be bound by theory, it is generally believed that a greater pressure drop generates smaller nitrogen bubbles and a more stable foamed cement. While not wishing to be bound by theory, the choked flow theory indicates that gas velocity reaches sonic speed (or maximum speed) when the pressure drop across the choke is equal to about 90% of the downstream pressure (i.e. capture pressure for apparatus 100, or wellhead pressure for foamed cement production in the field).

Once the cement slurry and gas are ready, valve 122 and valve 140 can be adjusted so that cement slurry is displaced from cement reservoir cell 110 into foam generator 124 through second leg 128 such that the cement slurry and gas mix to form a foamed cement that flows into third leg 130 and is subsequently introduced into foam capture cell 136. Basically, the pressure in foam capture cell 136 is pre-set to the capture pressure using pressure source 154 and back-pressure regulator 152. The pressure supplied by pump 118 is greater than the capture pressure. Thus, when the valves are appropriately opened to allow fluid flow, the pressure supplied by pump 118 forces piston 114 downward thus forcing the cement slurry from cement reservoir cell 110 into foam generator 124. Similarly, the pressure differential between the incoming foamed cement and the capture pressure allows foamed cement to flow into foam capture cell 136 in a controlled manner. Typically, pump 118 is run in flow rate control mode.

Foamed cement in foam capture cell 136 is allowed to cure or harden and then is depressurized and removed from foam capture cell 136. After removal, the foamed cement is analyzed to determine its characteristics, which can include bubble size and distribution, mechanical properties, strength-to-density ratio, etc.

The foam generation and testing can be repeated for different foam qualities and/or different cement slurry compositions. Based on the analysis, the foamed cement having quality and composition that has been determined to be most suitable for use in the subject well is selected. Subsequently, the selected foamed cement is used in a downhole process in the subject well.

EXAMPLES

Example 1

A base cement slurry was prepared using 1560.5 g cement mixed with 706.8 g water to which 15.11 g of a surfactant was added to achieve the base slurry density recited in Table 1. The surfactant used was a mixture of an ethoxylated alcohol ether sulfate, an alkyl or alkyene amidopropyl betaine and an alkyl or alkene amidopropyldimethylamine oxide commercially available from Halliburton Energy Services, Inc. under the trade name ZONESEALANT 2000™. The base cement slurry was used to prepare foamed cement slurry in an apparatus according to the above disclosure. Nitrogen was used as the foaming gas. Table 1 shows the conditions of foamed cement production.

| Sample No. | Base Slurry Density (lbm/gal) | Choke Size (mm) | Nitrogen Pressure (psi) | Capture Pressure (psi) | Cement Flow Rate (mL/min) |
|---|---|---|---|---|---|
| 1 | 15.7 | 0.1 | 1850 | 500 | 700 |

After curing of the resulting foamed cement, density was determined based on a sedimentation test similar to API 10B-2, section 12.5. For the test, a 2-inch diameter by 4-inch length core was obtained. The core sample was cut into 4 discs, each with a 1-inch thickness. The density of these discs of foamed cement was determined based on the Archimedes principle, i.e. by measuring the weight of the sample in air and the weight of displaced water when the sample is submerged in water. The average density of these samples was 10.7 lbm/gal, suggesting the foamed cement has a foam quality of 32%. The maximum density variation between different samples was ±0.25 lbm/gal.

Example II

Figure 7:
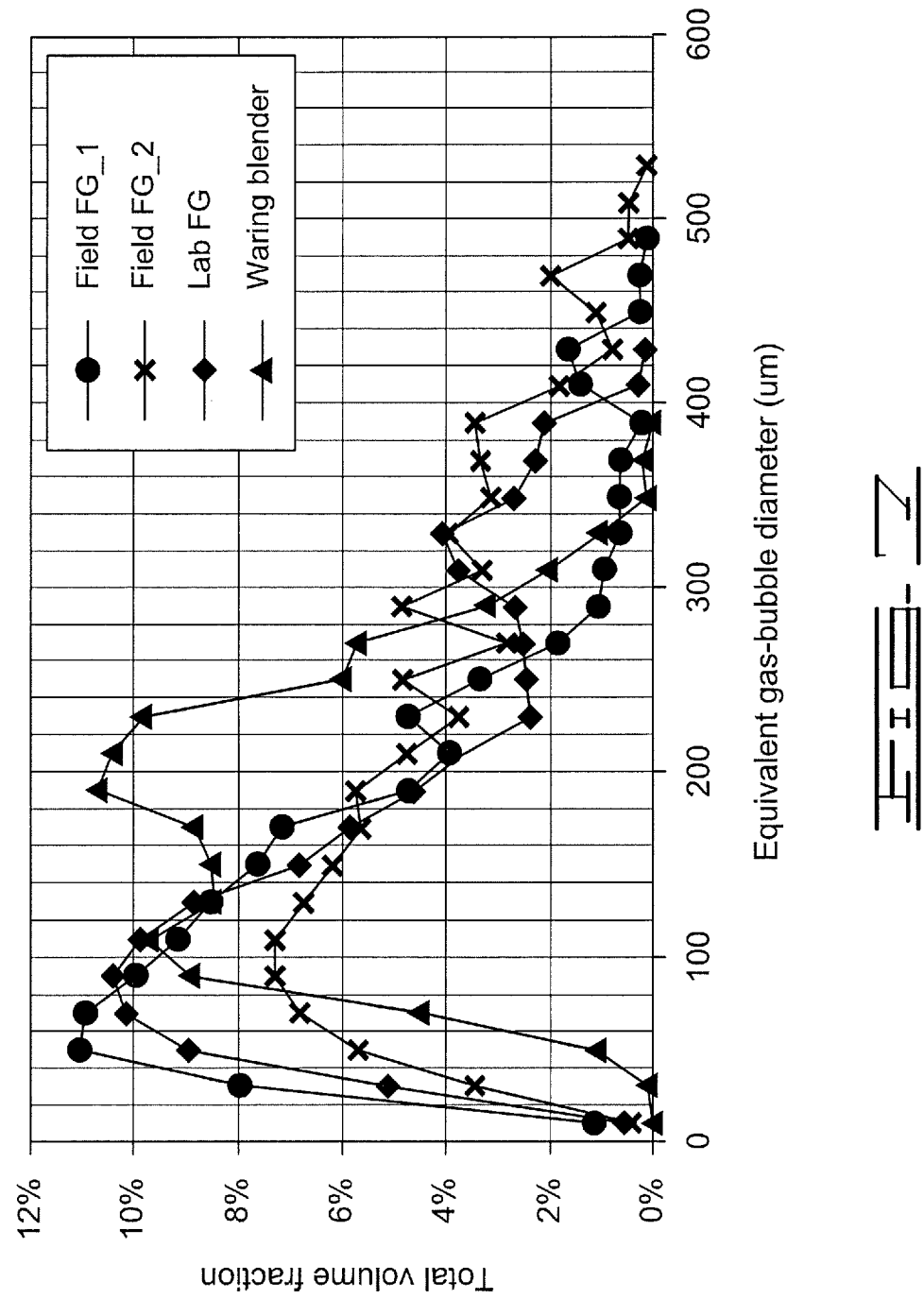
FIG. 7 is a chart of gas-bubble size versus total volume fraction for the same foamed cement samples as FIG. 6.

Foamed cement was produced by field equipment using a foam generator ("Field FG 1 and Field FG 2") and in a Waring blender according to API 10B-4 ("Waring blender sample"). The cement foam was produced at approximately 30% foam quality with similar cement composition for the cement slurry as for Sample 1. Nitrogen was used as the foaming gas with Field FG 1 and Field FG 2. Air was the foaming gas with the Waring blender. The gas-bubble size distribution of the resulting foamed cement of Example 1 (Lab FG), Field FG 1, Field FG 2 and the Waring blender sample are shown in FIGS. 6 and 7. It was noticed that Field FG 1 and Field FG 2 showed some sample-to-sample variations with some common characteristics: they both contain appreciable amounts of small gas bubbles ($\leq 60$ μm); and their gas bubble size distribution curves are asymmetric with the mode smaller than the median. On the other hand, the Waring blender sample contains almost no gas bubbles smaller than 60 μm and its gas bubble size distribution curve is more or less symmetric with the mode and median approximately the same. The foamed cement of Example 1 (Lab FG) has similar gas-bubble size distribution characteristics as Field FG 1 and Field FG.

Several alternative embodiments will now be set forth to further define the invention. In one group of embodiments, an apparatus for preparing foamed cement for laboratory analysis is provided. The apparatus comprises a source of pressurized gas, a cement reservoir cell, a foam capture cell and a foam generator. The cement reservoir cell is configured to pressurize a cement slurry contained within the cement reservoir cell to a capture pressure. The foam generator can have a first leg in fluid flow communication with the source of pressurized gas, a second leg in fluid flow communication with the cement reservoir cell, and a third leg in fluid flow communication with the foam capture cell. The foam capture cell is configured to receive pressurized foamed cement from the foam generator.

The first leg and the second leg of the foam generator can be perpendicular. The first leg and the third leg of the foam generator can be parallel and in-line. Typically, the gas is introduced into the foam generator through a choke.

In some embodiments, the foam capture cell has a first cylinder, and the apparatus further comprises a second gas source, which can be used to provide initial pressure to the foam capture cell. In some of these embodiments, the foam capture cell can have a piston. In such embodiments, the backpressure regulator controls the backpressure on a first side of the piston, and the foamed cement produced in the foam generator is introduced into the first cylinder from the foam generator on a second side of the piston.

In some embodiments, the cement reservoir cell has a second cylinder and a piston. In these embodiments, the apparatus further comprises a pump such that activation of the pump provides pressure on a first side of the piston and moves the piston in the second cylinder such that cement slurry on the second side of the piston moves out of the second cylinder and is introduced into the foam generator.

In some of the embodiments, the apparatus further comprising a first valve having a first position and a second position. The first position allowing fluid flow from the cement reservoir cell to the foam generation tee, and the second position prevents fluid flow from the cement reservoir cell to the foam generation tee. Also, the apparatus can further comprise a second valve having an on position and an off position. The on position allows fluid flow from the foam generation tee to the foam capture cell, and the off position prevents fluid flow from the foam generation tee to the foam capture cell.

In other embodiments, a method of preparing foamed cement in a laboratory environment for analysis is provided. The method comprises the steps of:
  preparing a cement slurry;
  introducing the cement slurry into a cement reservoir cell;
  pressurizing the cement reservoir cell to a pressure equal to the capture pressure;
  introduce a gas into a foam generator through a first leg of the foam generator;
  displacing the cement slurry from the cement reservoir cell into the foam generator through a second leg of the foam generator such that the cement slurry and gas mix to form a foamed cement that flows into a third leg of the foam generator; and
  introducing the foamed cement from the third leg into a foam capture cell.

In the method, the backpressure of the foam capture cell can be controlled so as to control the introduction of foamed cement into the foam capture cell. In some of these embodiments, the foam capture cell has a cylinder, and the apparatus further comprises a second gas source, which provides a backpressure to the cylinder. In some of these embodiments, the foam capture cell can have a piston, and the step of introducing the foamed cement from the third leg into the foam capture cell can comprise introducing the foamed cement into the cylinder so as to displace the piston. The backpressure can be supplied to the foam capture cell on a side of the piston opposite to the introduction of foamed cement.

In some of the above embodiments, the cement reservoir cell can have a cylinder and a piston. The cement slurry can be introduced into the cylinder, and the step of displacing the cement slurry can comprise running a pump to move the piston within the cylinder so as to displace the cement slurry from the cylinder.

In some embodiments of the method, the gas is introduced into the foam generator through a choke. Additionally, the first leg and the second leg can be perpendicular. Also, the first leg and the third leg can be parallel and in-line.

In some embodiments, the gas is selected from air, nitrogen and hydrogen. In some of these embodiments, the gas is nitrogen.

In some embodiments, the step of preparing a cement slurry comprises the steps of mixing an aqueous fluid and cement to form a base cement composition, and adding a surfactant to the base cement composition.

In many embodiments, the method further comprises removing the foamed cement from the foam capture cell and analyzing the foamed cement. In some of these embodiments, the method also comprises selecting a quality and composition of foamed cement that is determined to be most suitable for use in a well based on the analysis of the foamed cement, and using the selected quality and composition of foamed cement in a downhole process for the well.

While compositions and methods are described in terms of "comprising," "containing," or "including" various components or steps, the compositions and methods also can "consist essentially of" or "consist of" the various components and steps. Whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Additionally, where the term "about" is used in relation to a range it generally means plus or minus half the last significant figure of the range value, unless context indicates another definition of "about" applies.

Also, the terms in the claims have their plain, ordinary meaning unless otherwise explicitly and clearly defined by the patentee. Moreover, the indefinite articles "a" or "an", as used in the claims, are defined herein to mean one or more than one of the elements that it introduces. If there is any conflict in the usages of a word or term in this specification and one or more patent(s) or other documents that may be incorporated herein by reference, the definitions that are consistent with this specification should be adopted.

What is claimed is:

1. A method of preparing foamed cement in a laboratory environment for analysis comprising:
   preparing a cement slurry;
   introducing the cement slurry into a cement reservoir cell;
   pressurizing the cement reservoir cell to a pressure equal to or greater than a capture pressure selected to correspond to the conditions at a well site;
   introducing a gas into a foam generator through a first leg of the foam generator;
   displacing the cement slurry from the cement reservoir cell into the foam generator through a second leg of the foam generator such that the cement slurry and gas mix to form a foamed cement that flows into a third leg of the foam generator; and
   introducing the foamed cement from the third leg into a foam capture cell.

2. The method of claim 1, wherein a backpressure of the foam capture cell is controlled by a backpressure regulator so as to control the introduction of foamed cement.

3. The method of claim 2, wherein the cement reservoir cell has a cylinder and a piston, the cement slurry is introduced into the cylinder, and the step of displacing the cement slurry comprises running a pump to move the piston within the cylinder so as to displace the cement slurry from the cylinder.

4. The method of claim 3, wherein the step of preparing a cement slurry comprises the steps of mixing an aqueous fluid and cement to form a base cement composition, and adding a surfactant to the base cement composition.

5. The method of claim 4, wherein the gas is introduced into the foam generator through a choke.

6. The method of claim 5, wherein the first leg and the second leg are perpendicular.

7. The method of claim 6, wherein the first leg and the third leg are parallel and in-line.

8. The method of claim 1, wherein the gas is selected from air, nitrogen and hydrogen.

9. The method of claim 8, wherein the gas is nitrogen.

10. The method of claim 1, wherein the step of preparing a cement slurry comprises the steps of mixing an aqueous fluid and cement to form a base cement composition, and adding a surfactant to the base cement composition.

11. A method of preparing foamed cement in a laboratory environment for analysis comprising:
    preparing a cement slurry;
    introducing the cement slurry into a cement reservoir cell;
    pressurizing the cement reservoir cell to a pressure equal to or greater than a capture pressure selected to correspond to the conditions at a well site;
    introducing a gas into a foam generator through a first leg of the foam generator;
    displacing the cement slurry from the cement reservoir cell into the foam generator through a second leg of the foam generator such that the cement slurry and gas mix to form a foamed cement that flows into a third leg of the foam generator;
    introducing the foamed cement from the third leg into a foam capture cell; and
    removing the foamed cement from the foam capture cell and analyzing the foamed cement.

12. The method of claim 11, further comprising:
    selecting a quality and composition of foamed cement that is determined to be most suitable for use in a well based on the analysis of the foamed cement, and using the selected quality and composition of foamed cement in a downhole process for the well.

13. A method of preparing foamed cement in a laboratory environment for analysis comprising:
    preparing a cement slurry, wherein the step of preparing a cement slurry comprises the steps of mixing an aqueous fluid and cement to form a base cement composition, and adding a surfactant to the base cement composition;
    introducing the cement slurry into a cement reservoir cell;
    pressurizing the cement reservoir cell to a pressure equal to or greater than a capture pressure selected to correspond to the conditions at a well site;
    introducing a gas into a foam generator through a first leg of the foam generator;
    displacing the cement slurry from the cement reservoir cell into the foam generator through a second leg of the foam generator such that the cement slurry and gas mix to form a foamed cement that flows into a third leg of the foam generator; and
    introducing the foamed cement from the third leg into a foam capture cell, wherein a backpressure of the foam capture cell is controlled by a backpressure regulator so as to control the introduction of foamed cement.

14. The method of claim 13, further comprising removing the foamed cement from the foam capture cell and analyzing the foamed cement, and wherein the cement reservoir cell has a cylinder and a piston, the cement slurry is introduced into the cylinder, and the step of displacing the cement slurry comprises running a pump to move the piston within the cylinder so as to displace the cement slurry from the cylinder.

15. The method of claim 14, wherein the gas is introduced into the foam generator through a choke.

16. A method of preparing foamed cement in a laboratory environment for analysis comprising:

preparing a cement slurry, wherein the step of preparing a cement slurry comprises the steps of mixing an aqueous fluid and cement to form a base cement composition, and adding a surfactant to the base cement composition;

introducing the cement slurry into a cement reservoir cell;

pressurizing the cement reservoir cell to a pressure equal to or greater than a capture pressure selected to correspond to the conditions at a well site;

introducing a gas into a foam generator through a first leg of the foam generator, wherein the gas is introduced into the foam generator through a choke;

displacing the cement slurry from the cement reservoir cell into the foam generator through a second leg of the foam generator such that the cement slurry and gas mix to form a foamed cement that flows into a third leg of the foam generator, wherein the cement reservoir cell has a cylinder and a piston, the cement slurry is introduced into the cylinder, and the step of displacing the cement slurry comprises running a pump to move the piston within the cylinder so as to displace the cement slurry from the cylinder; and introducing the foamed cement from the third leg into a foam capture cell, wherein a backpressure of the foam capture cell is controlled by a backpressure regulator so as to control the introduction of foamed cement; and wherein the gas is selected from air, nitrogen and hydrogen.

17. The method of claim 16, wherein the first leg and the second leg are perpendicular.

18. The method of claim 17, wherein the first leg and the third leg are parallel and in-line.

19. The method of claim 16, further comprising removing the foamed cement from the foam capture cell and analyzing the foamed cement.

20. The method of claim 19, further comprising:

selecting a quality and composition of foamed cement that is determined to be most suitable for use in a well based on the analysis of the foamed cement, and using the selected quality and composition of foamed cement in a downhole process for the well.

* * * * *